UNITED STATES PATENT OFFICE.

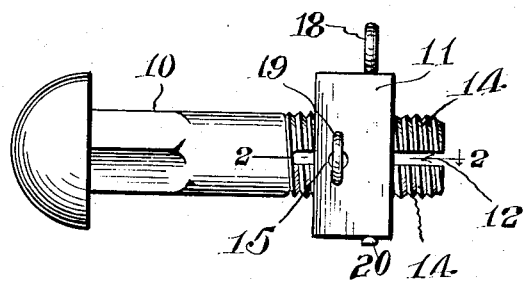
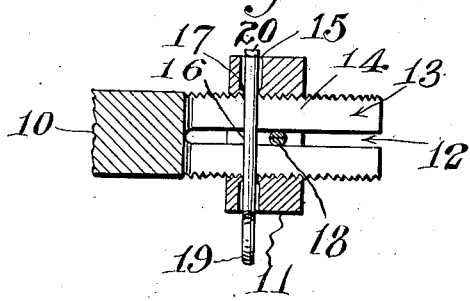
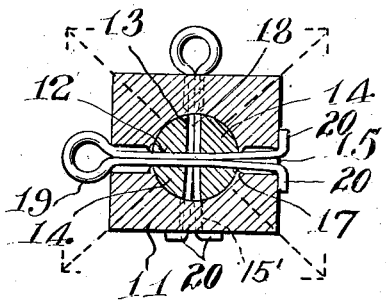
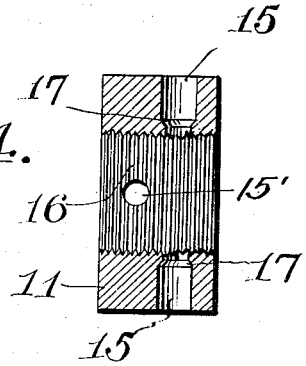

JOHN A. P. LEE, OF TUCKER, ARKANSAS.

NUT-LOCK.

1,104,681. Specification of Letters Patent. Patented July 21, 1914.

Application filed July 13, 1911. Serial No. 638,406.

*To all whom it may concern:*

Be it known that I, JOHN A. P. LEE, a citizen of the United States, residing at Tucker, in the county of Jefferson and State of Arkansas, have invented certain new and useful Improvements in Nut-Locks, of which the following is a specification.

This invention relates to improvements in nut and bolt locks, and has particular reference to the cross-key type of such devices.

One object of the invention is to provide a longitudinally slotted bolt, and a plurality of cross-keys, whereby the bolt is spread outwardly to cause its threads to bind with the threads of the nut.

Another object resides in the peculiar construction and operation of the device whereby the first object is attained.

In the drawings, Figure 1 is a side elevation of the device, Fig. 2 is a horizontal section on the line 2—2 of Fig. 1, Fig. 3 is a vertical transverse section through the nut and bolt, Fig. 4 is a vertical section through the nut.

Referring to the drawings, 10 represents a bolt and 11 the nut, each of which is provided with usual threads.

The bolt is provided with the kerfs 12 and 13 formed longitudinally in the threaded end of the bolt, at right angles to each other, thus forming the four sectors 14.

The nut 11, as shown, is a four-sided one, but it will be understood that the device may be used with a nut having any number of sides. Formed transversely through the nut, at right angles to each other, and in different planes are the openings 15 and 15', which are reduced at their inner ends, at the point where they communicate with the central opening 16 of the nut, with the inwardly beveled faces 17. The size of the opening 15 at the point where it intersects the opening 16 is of slightly greater diameter than the width of the slots 12 and 13 when the bolt is in expanded condition.

When the nut 11 is screwed home on the bolt 10, cotter pins 18 and 19 are passed through the openings in the nut, and the slots in the bolt, the ends of the cotter pins being directed into the slots by means of the beveled faces 17, and when forced therethrough exert an expanding force against the faces of the sectors 14. The said expanding force of each of the cotter pins is exerted at right angles to the other, so that the resultant of the combined forces will be in the direction of the dotted arrow. Thus the sectors of the bolt are forced into the nut, and effectively prevent any rotation of the nut in either direction. The ends 20 of the cotter pins are bent against the side faces of the nut on either side of the openings 15. In applying the cotter pins, it is necessary to force them through the slots 12 and 13, the pins being just enough larger than the slots when the bolt is in its normal condition, (that is before the application of the pin) so that an expansive force may be exerted against the sectors.

From the foregoing it will readily be seen that the device is simple, and that the sector portions of the bolt will be effectively and positively spread apart so that their threads will bind into the threads of the nut.

Particular attention is called to the fact that the frictional and positive lock between the bolt and nut takes place at the point of engagement of the nut with the bolt, and not on either side of the nut as seems common in similar devices, heretofore. Furthermore the threads of the bolt engage the threads of the nut at every point within their engaged area. The keys serve the double function of forcing the sectors into frictional engagement with the nut, and at the same time prevent any relative rotation of the nut and bolt.

What is claimed is:

A nut and bolt lock comprising a bolt having longitudinal slots formed therethrough and arranged at an angle to each other, a nut having a central threaded opening and openings through the nut in different planes intersecting the central opening at right angles to each other and across the central opening, said openings being reduced in size to the width of the slots in expanded condition at the points of communication with the central opening, and cross keys driven through said openings and the slots of the bolt, said keys being of a width slightly in excess of the width of the slots in unexpanded condition whereby the portions of the bolt bounding the said slots will be forced outwardly against the nut.

In testimony whereof I affix my signature, in the presence of two witnesses.

JOHN A. P. LEE.

Witnesses:
D. G. TUCKER,
EDGAR FOSTER.